Figure 3:
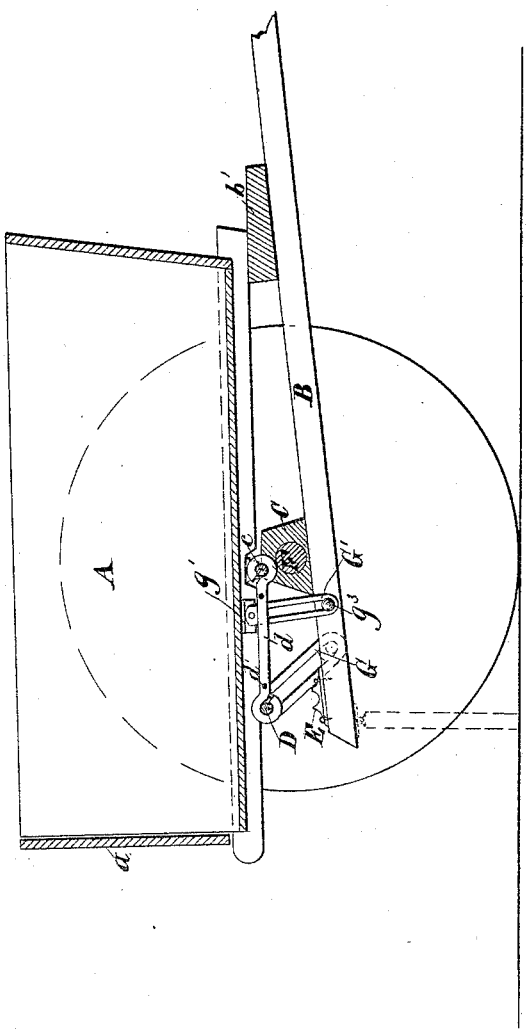

(No Model.) 2 Sheets—Sheet 1.
M. L. SENDERLING.
DUMPING CART.
No. 460,255. Patented Sept. 29, 1891.
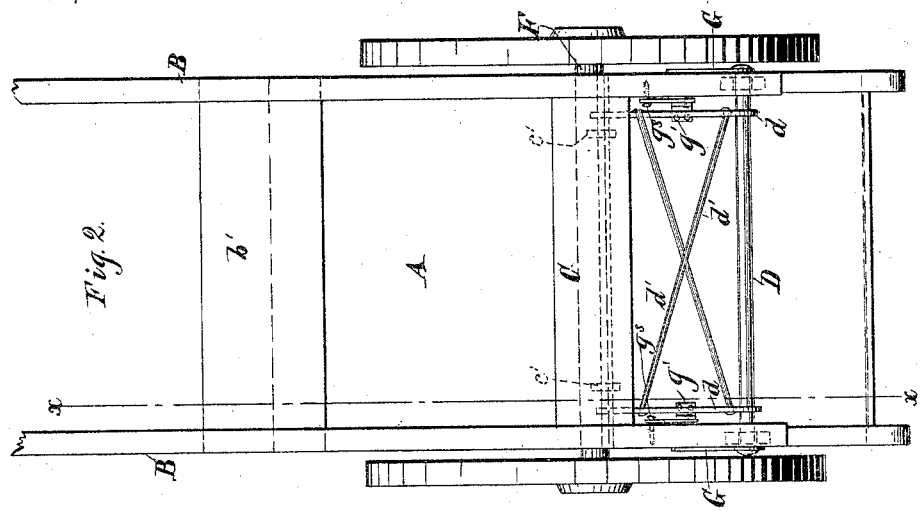
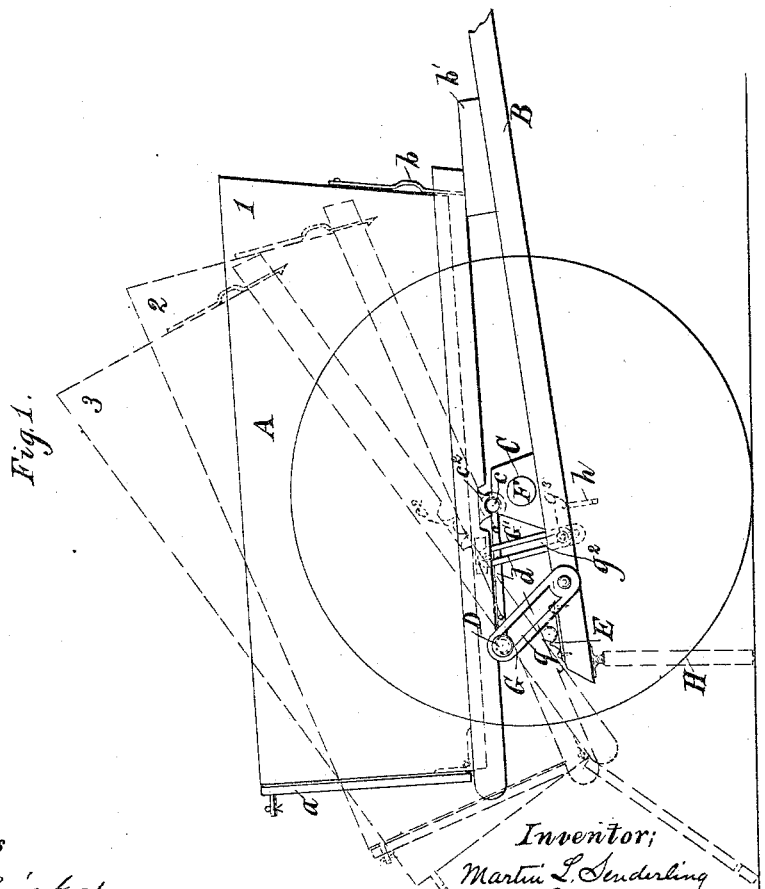
Witnesses
John Bicker
C. J. Sundgren
Inventor:
Martin L. Senderling
by his Attorneys
Brown & Griswold
THE NORRIS PETERS CO., PHOTO-LITHO., WASHINGTON, D. C.

(No Model.) 2 Sheets—Sheet 2.

M. L. SENDERLING.
DUMPING CART.

No. 460,255. Patented Sept. 29, 1891.

Witnesses:
John Bicker
O. L. Sundgren

Inventor:
Martin L. Senderling
by his attorneys
Brown & Griswold

UNITED STATES PATENT OFFICE.

MARTIN L. SENDERLING, OF JERSEY CITY, NEW JERSEY.

DUMPING-CART.

SPECIFICATION forming part of Letters Patent No. 460,255, dated September 29, 1891.

Application filed January 31, 1889. Renewed March 4, 1891. Serial No. 383,693. (No model.)

*To all whom it may concern:*

Be it known that I, MARTIN L. SENDERLING, of Jersey City, in the county of Hudson and State of New Jersey, have invented a certain new and useful Improvement in Dumping-Wagons, of which the following is a specification.

My improvement relates to wagons which may be tilted to dump a load.

I will describe in detail a dump-cart embodying my improvement, and then point out the novel features in claims.

In the accompanying drawings, Figure 1 is a side elevation of a dump-cart embodying my improvement. Fig. 2 is a bottom plan view of the same. Fig. 3 is a vertical longitudinal section taken on the plane of the line $x\ x$, Fig. 2.

Similar letters of reference designate corresponding parts in all the figures.

A designates the body of the cart, which may be of the usual or any desired construction, and provided with a swinging tail-board $a$, which in this instance is hinged to the floor of the cart and may be swung downwardly when the cart is to be dumped to form a chute along which the load may pass, as shown more clearly in dotted outline in Fig. 1. In this example of my improvement I have shown the cart-body as supported from an axle F, mounted upon a rearwardly-extending portion of the shafts B; but it might be supported from an axle mounted upon a frame in an ordinary manner, which frame would in turn be supported from the shafts, and springs of ordinary type might be interposed. In my improvement the body of the cart may be swung into three positions. I have numbered these positions 1, 2, and 3. The first is shown in full lines and the other two positions are shown in dotted outline. The first of these positions represents the cart-body as it will be when carrying a load, or, in other words, in its normal position, and it is to be observed that in this position it is supported about midway of its length. In this position the front end of the cart-body is locked by a snap-catch $b$ to a cross-piece $b'$, extending between and secured to the shafts B.

Secured upon an axle-bed C, extending crosswise beneath the cart-bed, I have shown an axle-bar $c$. The axle-bar $c$ is secured in the axle-bed by passing through eyes $c'$ upon the axle-bed. About midway in the length of the cart-body are bearing-pieces $c^2$, which when the cart occupies a normal position—namely, its first position—will bear upon the axle-bar $c$, so that the cart-body is supported by said axle-bar and the axle-bed and by the cross-piece $b'$. Rearward of the bearing-pieces $c^2$ and secured upon the under side of the cart-body is a bar or axle D. Pivotally connected to the bar or axle D and the axle-bar $c$ are links $d$, which links are cross-braced by braces $d'$. To the rear of the central support for the cart-body are bearings. In this example said bearings consist of metallic pieces E, secured upon the rear portion of the shafts B. When it is desired to tilt the cart, the catch $b$ is loosened and the forward end of the cart raised. During this movement it rocks upon the axle-bar $c$ as a center. The movement is continued until the bar or axle D rests within the bearing-pieces E. The cart is then in the second position. A still further movement raises the cart-body from off the axle-bar $c$, and the cart-body will then rock upon the rearward bearings E as a center. In any example of my improvement the rearward bearings E will be supported from the axle. It will be readily seen that after the cart-body has reached its second position the weight of the load will be shifted to the rear end portion of the cart-body, and the cart may therefore be very easily tilted into its third position and the load as readily dumped. During the tilting movements of the cart-body the links $d$, by their connection with the axle-bar $c$ and the bar or axle D, insure an accurate seating of the bar or axle D in the bearing-pieces E and operate to prevent the cart-body from sliding off from its support.

It is to be observed that the axle-bar $c$ and bearing-pieces $c^2$ are arranged to the rear of the axle F in this example of my improvement, which arrangement facilitates the raising of the forward end of the cart-body in order to start the load from its first position.

I may, if desired, employ guides or stops to guide the cart-body in its rocking movements and also to prevent the movement of the body too far in a given direction, as well as to prevent lateral sway of the cart-body near its rear end. I have shown such guides or stops as consisting of links G G'. The links G are pivoted upon the exterior of the shafts B and are provided with longitudinal slots $g$, through which the outer ends of the bar or axle D extend. The links G prevent a too-extended upward movement of the rear end of the cart. The guides G' are pivoted upon angle-plates $g'$, secured to the bottom of the cart-body. These guides are provided with longitudinal slots $g^2$, through which extend pins or studs $g^3$, secured upon the inner sides of the shafts B. When the cart-body is tilted and reaches its third position, the pin $g^3$ acts upon the end of the slot $g^2$ to prevent the tilting of the cart-body beyond its third position. All of the links operate to prevent lateral swaying of the cart-body. I do not, however, deem it wholly essential to my invention that the links G G' should be employed, and they may be omitted, if desired. I have shown supporting bars or rods H, in Fig. 1, pivoted upon the under sides of the shafts, which may be let down to support the shafts to relieve strain upon the horse when the load is to be dumped. When not in use, these supports may be held up against the shafts by means of hooks $h$.

Although I have illustrated the cart-body as supported normally upon the axle-bar $c$ and the links $d$ as connected to the said axle-bar, it is obvious that the axle-bar might be omitted and the cart-body supported directly upon the axle-bed, while the links $d$ might be connected directly to the axle-bed. In fact, if an axle only were used without any axle-bed, the cart-body might be supported directly on the axle and the links $d$ be connected to the axle. It is quite clear, also, that the bar or axle D might be omitted and the links $d$ be connected directly to the rearward portion of the cart-body by eyebolts or otherwise.

What I claim as my invention, and desire to secure by Letters Patent, is—

1. In a dump-cart, the combination, with a body, of a support for the said body about midway in its length and upon which it may rock, and bearings rearward of said support upon which the body when tilted will rest and upon which it may also be rocked, said bearings being supported from the axle, substantially as specified.

2. In a dump-cart, the combination, with a body, of a support for the said body about midway in its length and upon which it may rock, bearings rearward of said support upon which the body when tilted will rest and upon which it may also be rocked, said bearings being supported from the axle, and links connected to the rearward portion of the body or an appurtenance thereof and to the said support, substantially as specified.

3. In a dump-cart, the combination, with a body, of a support for the said body about midway in its length and upon which it may rock, bearings rearward of said support upon which the body when tilted will rest and upon which it may also be rocked, said bearings being supported from the axle, and a swinging leg or support H, substantially as specified.

4. In a dump-cart, the combination, with a body, of an axle-bar upon which the same is supported when in its normal position and upon which it may rock, a bar or axle to the rear of the said axle-bar, and bearing-pieces for said axle-bar, whereby when the wagon-body is tilted it will first rock upon the axle-bar, will next rest upon both the axle-bar and the said bar or axle, and, thirdly, will be rocked upon the bar or axle, substantially as specified.

5. In a dump-cart, the combination, with a body, of an axle-bed, a support for said axle-bed, an axle-bar, bearing-pieces on the cart-body adapted to seat on said axle bar, bearing-pieces on the support for the axle-bed, and a bar or axle on the cart-body, substantially as described, whereby when the cart-body is tilted it will first be rocked upon the first-named bearing-pieces and then upon the second-named bearing-pieces, substantially as specified.

6. In a dump-cart, the combination, with a body, of an axle-bed, a support for the axle-bed, bearing-pieces on the body, an axle-bar supported upon the axle-bed to the rearward of the axle, a bar or axle secured upon the cart-body, and bearing-pieces upon the support of the axle-bed, substantially as specified.

7. In a dump-cart, the combination, with a body, of an axle-bed, a support for the axle-bed, bearing-pieces upon the body, an axle-bar supported upon the axle-bed, a bar or axle supported upon the cart-body, bearing-pieces upon the support for the axle-bed, and links connecting said axle-bar and the bar or axle, substantially as specified.

8. In a dump-cart, the combination, with a body, of an axle-bed, a support for the axle-bed, bearing-pieces upon the body, an axle-bar supported upon the axle-bed, a bar or axle supported upon the body, bearing-pieces for the bar or axle upon the support for the axle-bed, and guides constituting stops extending between the said support and the cart-body, substantially as specified.

9. In a dump-cart, the combination, with a body, of an axle-bed, a support for the axle-bed, bearing-pieces upon the body, an axle-bar supported upon said axle-bed, a bar or axle on the body, bearing-pieces upon said support for said bar or axle, and guides constituting stops for the body, certain of said guides having a pivotal connection with said support and a slotted connection with the body, and certain other of the guides having a pivotal connection with the body and a slotted connection with said support, substantially as specified.

MARTIN L. SENDERLING.

Witnesses:
FREDK. HAYNES,
K. E. PEMBLETON.